US012674327B2

(12) United States Patent
Colsen et al.

(10) Patent No.: US 12,674,327 B2
(45) Date of Patent: Jul. 7, 2026

(54) SERVER RAMP

(71) Applicant: PHS West, LLC, Charlotte, NC (US)

(72) Inventors: Nowell Colsen, St. Francis, MN (US);
Jared Bodin, Waverly, MN (US)

(73) Assignee: PHS West, LLC, Charlotte, NC (US)

( * ) Notice: Subject to any disclaimer, the term of this
patent is extended or adjusted under 35
U.S.C. 154(b) by 965 days.

(21) Appl. No.: 17/874,758

(22) Filed: Jul. 27, 2022

(65) Prior Publication Data

US 2023/0035239 A1     Feb. 2, 2023

Related U.S. Application Data

(60) Provisional application No. 63/226,053, filed on Jul.
27, 2021.

(51) Int. Cl.
E04F 11/00          (2006.01)
B65G 65/00          (2006.01)
(52) U.S. Cl.
CPC ............ E04F 11/002 (2013.01); B65G 65/00
(2013.01); *B65G 2201/0267* (2013.01); *E04F*
*2011/007* (2013.01)
(58) Field of Classification Search
CPC .... B65G 69/30; B65G 69/28; B65G 69/2811;
B65G 69/2835; B65G 69/26; B65G
65/00; E04F 2011/005; E04F 2011/007;
E04F 11/002; B64F 1/324; B64F 1/322;
B64F 1/326; B60P 1/431; B60P 1/438;
B60P 1/43; A61G 3/067; A61G 3/061
See application file for complete search history.

(56) References Cited

U.S. PATENT DOCUMENTS

| | | | | |
|---|---|---|---|---|
| 4,517,698 A | * | 5/1985 | Lamp'l | B64F 1/324 |
| | | | | 14/72.5 |
| 2002/0074456 A1 | * | 6/2002 | Marrero | B64F 1/324 |
| | | | | 244/137.1 |
| 2007/0140805 A1 | * | 6/2007 | Johnson | B61D 45/00 |
| | | | | 410/46 |
| 2011/0023419 A1 | * | 2/2011 | Lancaster, III | B65B 11/00 |
| | | | | 198/465.1 |
| 2018/0009550 A1 | * | 1/2018 | Thøgersen | B64F 1/368 |
| 2018/0312350 A1 | * | 11/2018 | Tower | B65G 69/30 |
| 2019/0104673 A1 | * | 4/2019 | Potter | B62D 53/061 |
| 2022/0219846 A1 | * | 7/2022 | Jackson | G06V 20/52 |

* cited by examiner

*Primary Examiner* — Glenn F Myers
(74) *Attorney, Agent, or Firm* — Padda Law Group

(57) ABSTRACT

A moveable ramp and method of moving cargo using a
moveable ramp. The moveable ramp includes a ramp struc-
ture comprising a plurality of planar portions including a
lower inclined portion, an upper inclined portion, a first
horizontal portion extending between the lower inclined
portion and the upper inclined portion and a second hori-
zontal portion extending from an upper end of the upper
inclined portion wherein the horizontal portions act as
landing zones for a delivery tug moving the cargo onto and
off of the ramp. The ramp also includes a locking mechanism
at the top end to secure the ramp to a pallet, for sample. The
ramp may further include automatic struts such as gas struts.

17 Claims, 15 Drawing Sheets

PALLET

PALLET

PALLET

PALLET

PALLET

SERVER RAMP

PRIORITY CLAIM

This application claims priority to U.S. Provisional Application No. 63/226,053, filed Jul. 27, 2021, entitled Server Ramp, the disclosure of which is incorporated by reference in its entirety.

FIELD OF INVENTION

The present invention relates generally to a server ramp for moving a server rack. More specifically, the present invention relates to a server ramp which is connected to a server pallet for easy movement of the ramp while loading and unloading of goods or products including but not limited to server racks.

BACKGROUND OF INVENTION

With the increase in the challenges faced by various industries, and especially the logistics industry, there has been an exponential demand in order to cater the problems faced by these industries. Logistics has now become an important part of our daily lives. From buying vegetables to ordering food online, the commercial activity of transferring goods from one place to another has increased rapidly. Furthermore, not only the transfer of goods is an important factor but also the safe transfer of goods plays a vital role for the logistics industry. In order to deliver the goods safely and timely, it is important to have equipment which are highly efficient.

One such important equipment is a ramp which is an inclined plane having a flat supporting surface tilted at an angle, with one end higher than the other, used as an aid for moving a load. These ramps are utilized in almost every industry which aims to transport goods from one location to another.

Easy movement of the ramp to a load is a major issue that needs to be addressed to attain a more efficient and safe delivery of goods. Previous patents had crank-down legs which do not provide easy for each movement of the ramp. Moreover, auto-leveling of the ramp is an important aspect that needs to be focused upon in order to allow easy movement of the goods.

Prior art devices don't tend to solve the problem of easy movement of a ramp. Furthermore, the prior art does not seem to provide a ramp design which includes flat landing zones at appropriate locations that allows the tug to remain in place when the user is connecting the server rack, thus eliminating a large power consumption requirement to hold the tug on the incline during user intervention.

Hence, there remains a need to develop a ramp that (1) allows for easier movement of the ramp to a load such as a server pallet, (2) provides a secure attachment of the ramp to a pallet and (3) providing a ramp that is configured to allow a tug to remain on the ramp in an energy efficient manner.

SUMMARY OF THE INVENTION

The present invention relates to a mobile ramp. The mobile ramp comprises a ramp frame that includes a ramp, landing zones, and side walls, handles attached to the ramp frame, gas struts attached to the ramp frame, and a locking mechanism attached to the ramp frame.

In use, the mobile ramp is rolled to an elevated, stepped up planar location such as a platform or pallet or other type of elevated stand or support that has cargo on it such as a server rack. The locking mechanism is used to secure the mobile ramp to the pallet. A tug is driven up (backed up) the ramp to deliver or remove its cargo to the top of the pallet. The tug is driven up the ramp until its wheels are on the landing zones. The landing zones help the tug stay in place during the time the server rack is being connected to or disconnected from the tug. The landing zones help significantly reduce, if not eliminate, a large power consumption by the tug to remain in place on the ramp during the connection of the server rack to the tug. Also, as a load is placed on the ramp, the gas struts may auto-level the ramp. So, when a tug such as a server tug or a cargo such as a server rack moves across the ramp, the ramp is level. In some embodiments, when a person walks up the ramp, the gas struts will auto-level the ramp. As such, when the ramp is loaded, the gas struts may assist in grounding the unit. Furthermore, when there is no load on the ramp, the gas struts may allow for easy movement of the ramp. As such, the auto-leveling system eliminates the need to manually adjust jacks when preparing to load or offload servers or other cargo. Instead a user may simply position the ramp and add weight to align it with the cargo base.

In one embodiment, a mobile ramp of the present invention comprises a ramp frame that comprises a ramp with a first end and a second end, a first side and a second side. A first wall extends upward from the first side and a second wall extends upward from the second side. A first surface and a second surface extend outwardly from the first wall and second wall. The first surface includes mounting holes adapted to receive ends of a handle to secure the handles to the ramp structure. The ramp structure further comprises four wheels, one at each corner. Also, the ramp structure includes a housing on each corner of the structure to support a gas strut. The second end of the ramp is higher than the $1^{st}$ end of the ramp. A first landing zone and a second landing zone extend from the second end of the ramp. The landing zones are substantially flat surfaces that are adapted to support the front wheels of a tug and allow the tug to remain in place on the ramp without expending power to hold the tug on the incline of the ramp.

In certain embodiments, one advantage of a mobile ramp of the present invention is the ease with which it can be moved to another load.

In certain embodiments, another advantage of a mobile ramp of the present invention is the use of gas struts to auto-level the ramp when it is loaded.

In certain embodiments, another advantage of a mobile ramp of the present invention is the use of gas struts to ground the ramp when it is loaded.

In certain embodiments, another advantage of a mobile ramp of the present invention is the use of gas struts to make the ramp easier to move when it is not loaded.

In certain embodiments, another advantage of a mobile ramp of the present invention is having landing zones to hold a tug in place on the incline of the ramp without consuming power to hold the tug on the incline of the ramp.

In certain embodiments, another advantage of a mobile ramp of the present invention is the length of the ramp which is shorter than ramps used for non-powered rack removal. This advantage is achieved in certain embodiments by have an incline at a steeper angle than the angles used in pedestrian-only ramps.

Various embodiments include movable ramps and methods of using movable ramps, such as to transport cargo such as wheeled server racks using a tug. In some embodiments, the moveable ramp includes a ramp structure comprising a plurality of planar portions including a lower inclined portion, an upper inclined portion, a first horizontal portion extending between the lower inclined portion and the upper inclined portion and a second horizontal portion extending from an upper end of the upper inclined portion. It also includes a locking mechanism at a top end of the ramp configured to secure the ramp to a pallet. In some such embodiments, the first horizontal portion and the second horizontal portion are spaced apart by a distance equal to the distance between front and rear wheels of a tug configured to be used with the ramp. The locking mechanism may be a latch configured to engage a pallet rail. The moveable ramp may also include a plurality of springs such as gas springs. It may also include a plurality of wheels attached to a bottom of the ramp. In some such embodiments, a plurality of gas springs may be located between each wheel and the bottom of the ramp. In some embodiments, the ramp portion of the movable ramp may also include a ground portion extending from a lower end of the lower inclined portion and configured to touch the floor. The ground portion is generally horizontally oriented.

Other embodiments include methods of loading or unloading a cargo onto or from a stepped up delivery location such as a pallet. The method includes positioning a ramp adjacent to the pallet. The ramp may include a ramp structure including a plurality of planar portions including a lower inclined portion, an upper inclined portion, a first horizontal portion extending between the lower inclined portion and the upper inclined portion, and a second horizontal portion extending from an upper end of the upper inclined portion, as well as a locking mechanism at a top end of the ramp configured to secure the ramp to an elevated delivery location. The method further includes locking the ramp to the pallet using the locking mechanism and moving a wheeled delivery tug having a first wheel and a second wheel up the ramp until the first wheel is located on the first horizontal portion of the ramp and the second wheel is located on the second horizontal portion of the ramp. In some embodiments, the cargo is a server rack.

In some methods, the first wheel comprises a rear wheel of a tug and the second wheel comprises a front wheel of a tug, such that moving the wheeled delivery tug comprises backing the wheeled delivery tug up the ramp.

In some methods, loading or unloading a cargo onto or from the elevated delivery location comprises unloading a cargo from the pallet, further comprising: connecting the cargo to the tug and then moving the tug off of the ramp with the attached cargo. In other methods, loading or unloading a cargo onto or from the elevated delivery location comprises loading a cargo onto the pallet, wherein moving the wheeled delivery tug onto the ramp comprises moving the wheeled delivery tug with an attached cargo onto the ramp until the cargo is in position on the pallet. Such methods further include detaching the cargo from the wheeled delivery tug onto the pallet.

In various embodiments, the method also includes automatically leveling the ramp with gas struts attached to the ramp after positioning the ramp. In some such embodiments, automatically leveling the ramp includes a user walking on the ramp or a tug moving onto the ramp.

In some embodiments, the moveable ramp includes a ramp structure including a plurality of planar portions including a lower inclined portion, an upper inclined portion, a first horizontal portion extending between the lower inclined portion and the upper inclined portion, a second horizontal portion extending from an upper end of the upper inclined portion, and a ground portion extending from a lower end of the lower inclined portion, the ground portion configured to abut a floor when the ramp is in position for use. The moveable ramp also includes a locking mechanism at a top end of the ramp configured to secure the ramp to a pallet, a plurality of springs, and a plurality of wheels. The plurality of springs may be gas springs which may be configured to lower the ramp such that the ground portion abuts the floor when the ramp is in position for use and to raise the ramp such that the ground portion does not abut the floor when the ramp is moved. The gas springs may further be configured to level the top of the ramp with the cargo base when in use.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments. These and other features, benefits, and advantages of the present invention will become apparent by reference to the following text figure, with like reference numbers referring to like structures across the views, wherein.

Other features of the present embodiments will be apparent from the accompanying drawings and from the detailed description that follows.

DETAILED DESCRIPTION OF THE INVENTION

The present invention relates to a mobile ramp. The mobile ramp comprises a ramp frame that includes a ramp, landing zones, and side walls, handles attached to the ramp frame, gas struts attached to the ramp frame, and a locking mechanism attached to the ramp frame.

A mobile ramp of the present invention may be used to move server racks. These server racks are typically loaded with electronic equipment. When loaded with electronic equipment, these server racks may weigh between 3,000-5,000 pounds. Each rack is on a pallet. A mobile ramp of the present invention allows for easy movement of the ramp to a pallet. That is, the mobile ramp is rolled to a pallet that has a server rack on it. A locking mechanism on the mobile ramp is used to secure the mobile ramp to the pallet. A tug is a motorized wheeled device with one or more front wheels and one or more rear wheels which pulls a cargo such as a wheeled cargo like a server rack loaded with servers or other electronic equipment. The cargo attaches to the rear end of the tug to move the wheeled cargo such as the wheeled server rack. The tug backs up the ramp, with the server rack behind it, to raise the server rack onto a pallet, or to attach to a server rack that is on a pallet and remove it from the pallet. Once the tug is backed up into position on the ramp, its front wheels are on the central landing zone and the rear wheels are on the top landing zone. The landing zones help the tug stay in place during the time the server rack is being connected to or disconnected from the tug. The landing zones help significantly reduce, if not eliminate, a large power consumption by the tug to remain in place on the ramp during the connection or disconnection of the server rack to the tug. Also, as a load is placed on the ramp, the gas struts auto-level the ramp. So, when a server tug or a server rack moves across the ramp, the ramp is level. In some embodiments, when a person walks up the ramp, the gas struts will auto-level the ramp. As such, when the ramp is loaded, the gas struts assist in grounding the unit. Furthermore, when there is no load on the ramp, the gas struts allow for easy movement of the ramp.

Figure 1:
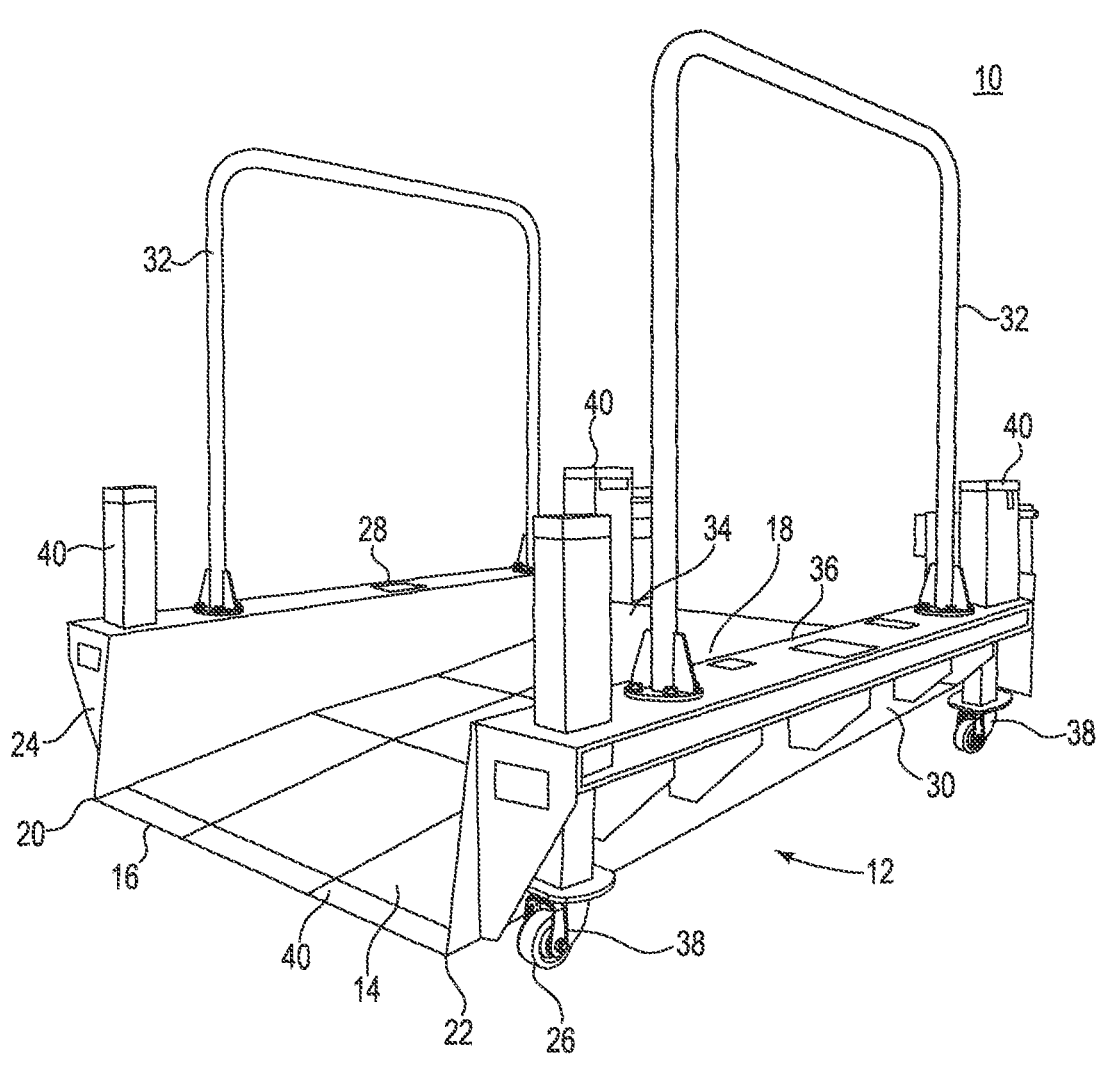
FIG. 1 shows a perspective view of an embodiment of a mobile ramp of the present invention.

FIG. 1 shows a perspective view of an embodiment of a mobile ramp 10. In one embodiment, a mobile ramp 10 of the present invention comprises a ramp frame 12 that comprises a ramp 14 with a first end 16 and a second end 18, a first side 20 and a second side 22. A first wall 24 extends upward from the first side 20 and a second wall 26 extends upward from the second side 22. A first surface 28 and a second surface 30 extend outwardly from the first wall 24 and second wall 26. The first surface 28 includes mounting holes 29 adapted to receive ends 33 of a handle 32 to secure the handles 32 to the ramp structure 12. The ramp structure 12 further comprises four wheels 38, one at each corner. Also, the ramp structure 12 includes a housing 40 on each corner of the structure to support a gas strut. The second end 18 of the ramp 14 is higher than the $1^{st}$ end 16 of the ramp 14. A first landing zone 34 centrally located on the ramp and a second landing zone 36 at the second end 18 of the ramp 14. The landing zones 34, 36 are substantially flat, horizontal surfaces that are adapted to support the front wheels and rear wheels of a tug after it is backed up onto the ramp and allow the tug to remain in place on the ramp 14 without expending power to hold the tug on the incline of the ramp.

Figure 2:
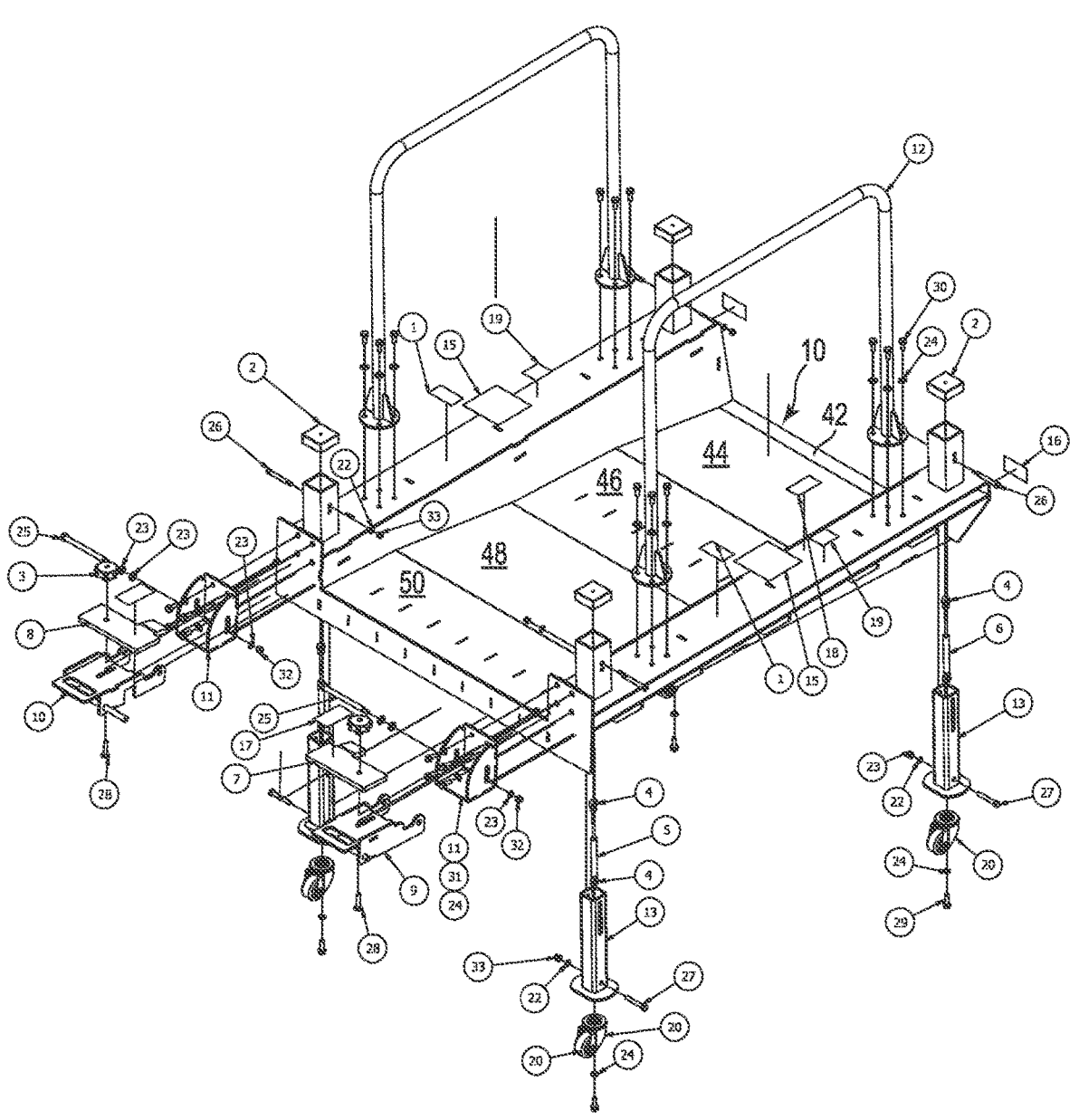
FIG. 2 shows an exploded view of an embodiment of a mobile ramp.
Figure 3:
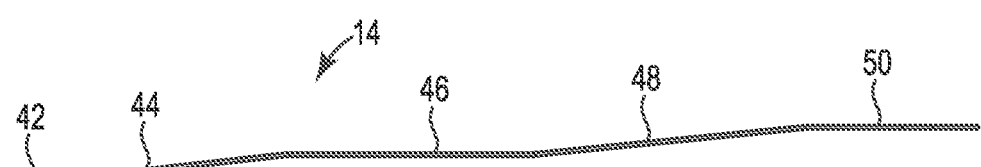
FIG. 3 shows a profile of an embodiment of a ramp.

FIG. 2 shows an exploded view of an embodiment of the mobile ramp 10. A top view of the ramp 14 is shown. As shown, the ramp has five sections 42, 44, 46, 48, and 50. FIG. 3 shows s profile of a ramp 14. As can be appreciated, section 42 is configured to be at floor level and is generally horizontally oriented. Sections 44 and 48 are inclined upward from the floor level. Section 46, located between the inclined sections 44 and 48 is generally horizontally oriented a landing zone for the front wheel or wheels of the tug.

Section 50, at the top of the ramp, is also generally horizontally oriented and provides another landing zone for the rear wheel or wheels of the tug. In this way, when the rear of the tug is fully backed up with ramp 14 (with the server ramp attached and positioned on the pallet, or to attach to a server ramp located on a pallet), the rear wheels or wheels are located on the central landing zone of section 46 while the front wheel or wheels of the tug are located on the top landing zone of section 50. As such, all of the wheels of the tug are located on horizontally oriented portions of the ramp. In addition, sections 46 and 50 are spaced apart by a distance which matches the distance between the front and rear wheels of the tug so that the ramp and tug are configured to work together.

Figure 4:
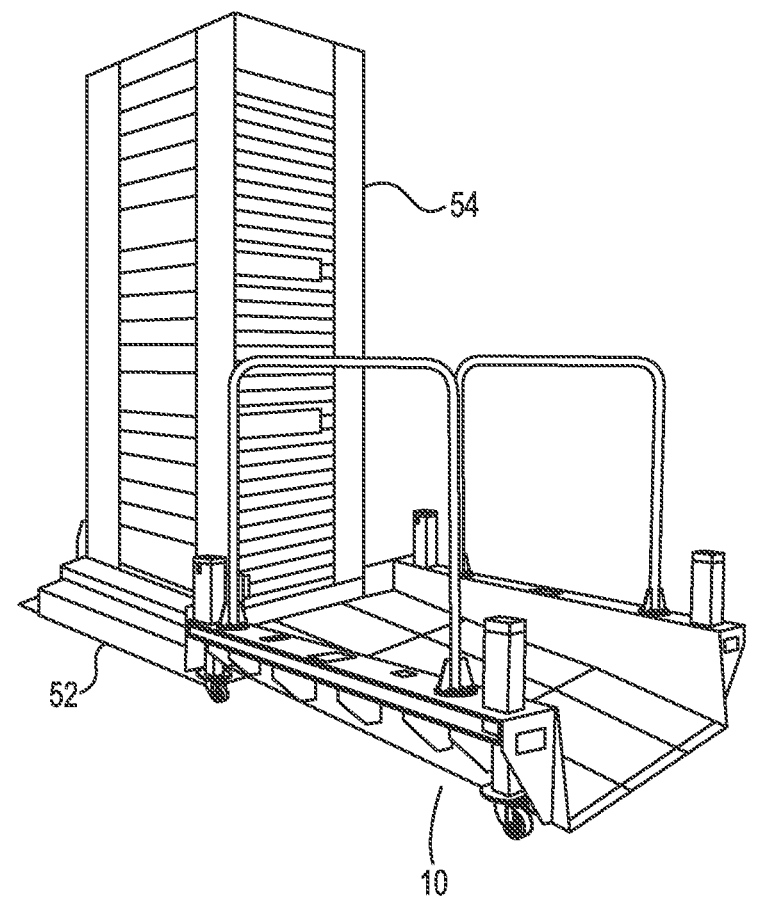
FIG. 4 shows a perspective view of an embodiment of a mobile ramp attached to a pallet with a server rack.
Figure 5:
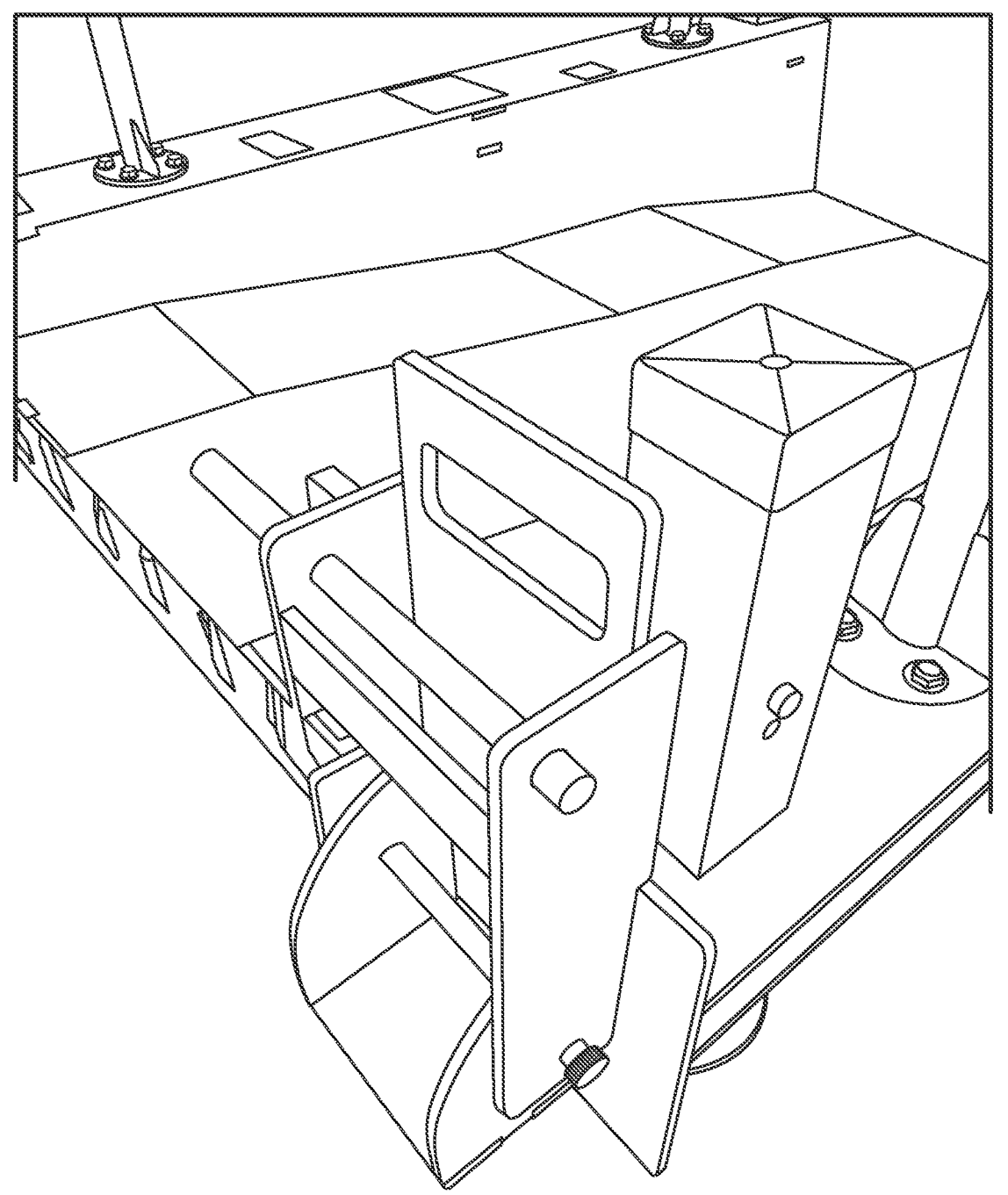
FIG. 5 shows an embodiment of a locking mechanism.
Figure 6:
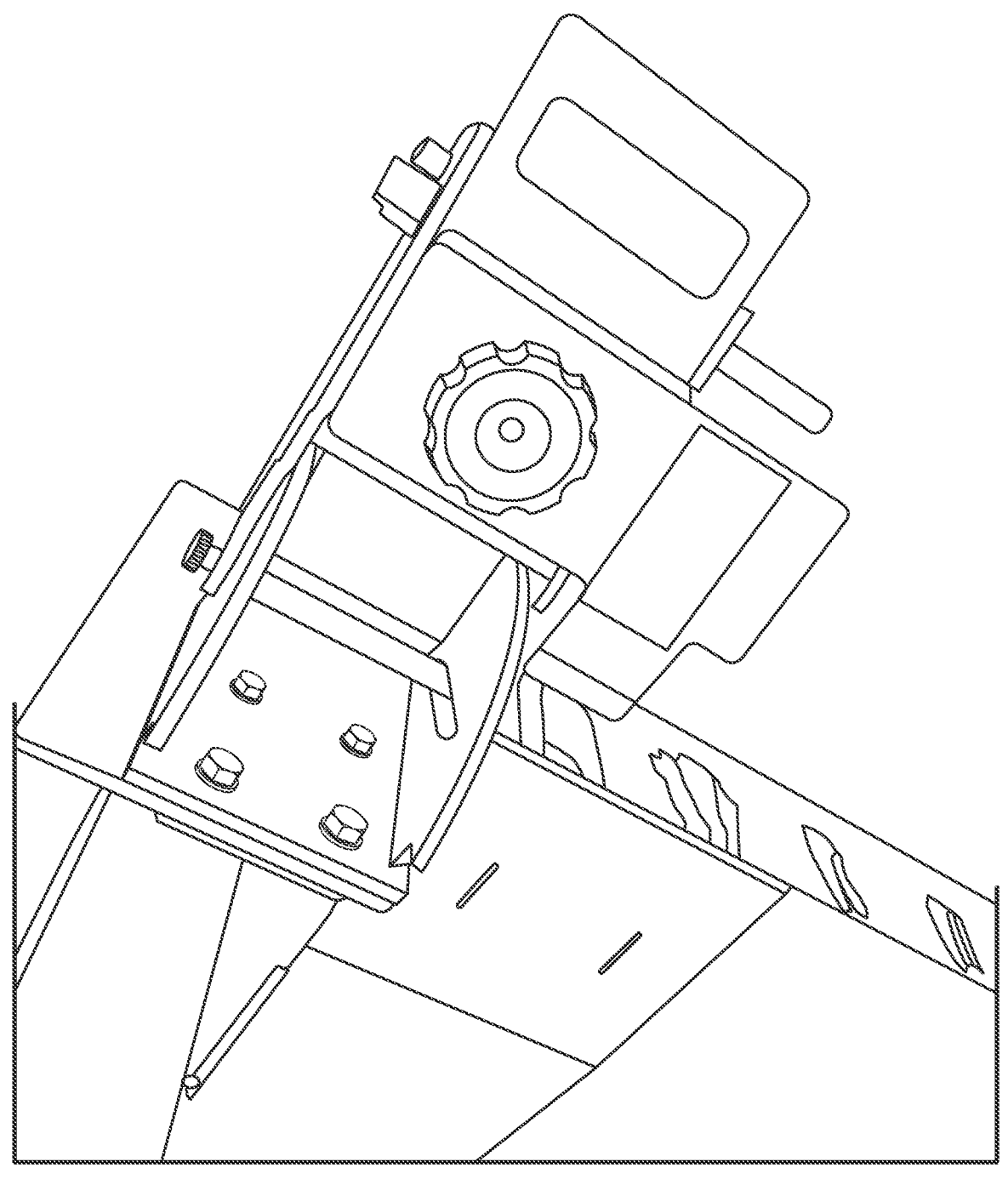
FIG. 6 shows an embodiment of a locking mechanism.

FIG. 4 shows a mobile ramp 10 attached to a pallet 52 and a server rack 54. FIGS. 5 and 6 show an embodiment of a locking mechanism 56. The locking mechanism 56 is attached to the ramp structure 12. The locking mechanism 56 is used to secure the ramp to the pallet holding the server rack using latches. Other types of locks may alternatively be used to securely engage and disengage the ramp 14 from the pallet. For example the ramp may include one or more hooks, latches, clamps, bolts, rods, apertures, loops, or other secure locking elements to releasably engage with matching locking elements on the pallet. Once the tug is at the top of the ramp and the wheels of the tug are on the landing zones which are on section 50 of the ramp, then the server rack is attached to the tug. Then rack then can be moved safely and efficiently.

FIGS. 5 and 6 show embodiments of the locking mechanism in a raised and lowered position. The locking mechanism includes a latch and an adjustment knob. In use, the ramp is rolled up to the pallet and centered on the pallet. The user then engages the first locking mechanism. The user lowers the latch, loosens the adjustment knob, and slides the latch against the pallet rail. The user then snugs the latch adjustment knob, making the distance between the ramp and the pallet as little as possible. The process is then repeated on the other side for the second locking mechanism. The user may then walk up the ramp to level the edge of the ramp to the pallet and then tighten the adjustment knobs of both the first and second locking mechanisms. To disconnect the ramp, the latches may be loosened if needed. The user then raises the latches to disengage them from the pallet rail. The user may then roll the ramp away from the pallet.

Figure 7:
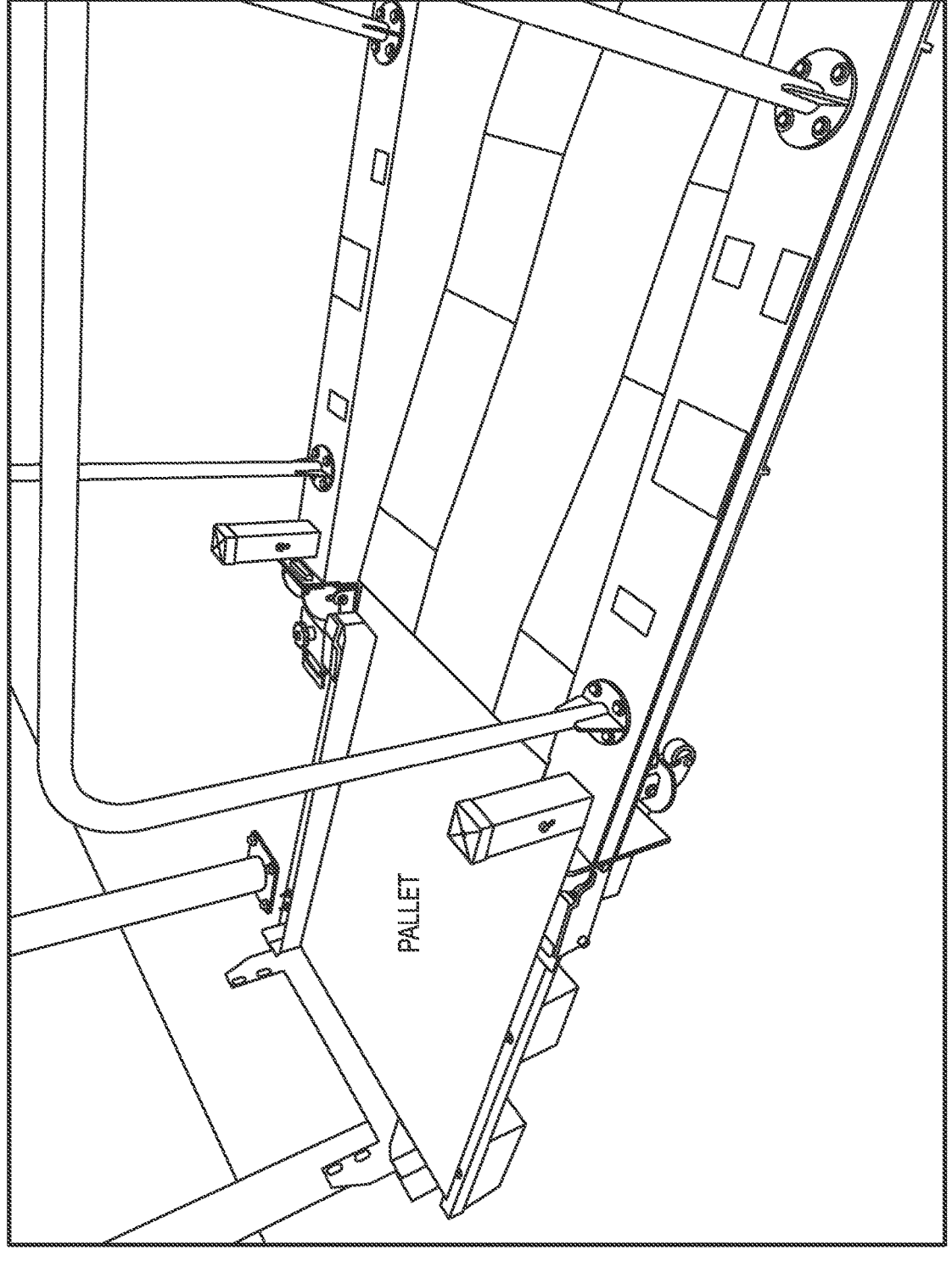
FIG. 7 shows a perspective view of an embodiment of a mobile ramp attached to a pallet.
Figure 8:
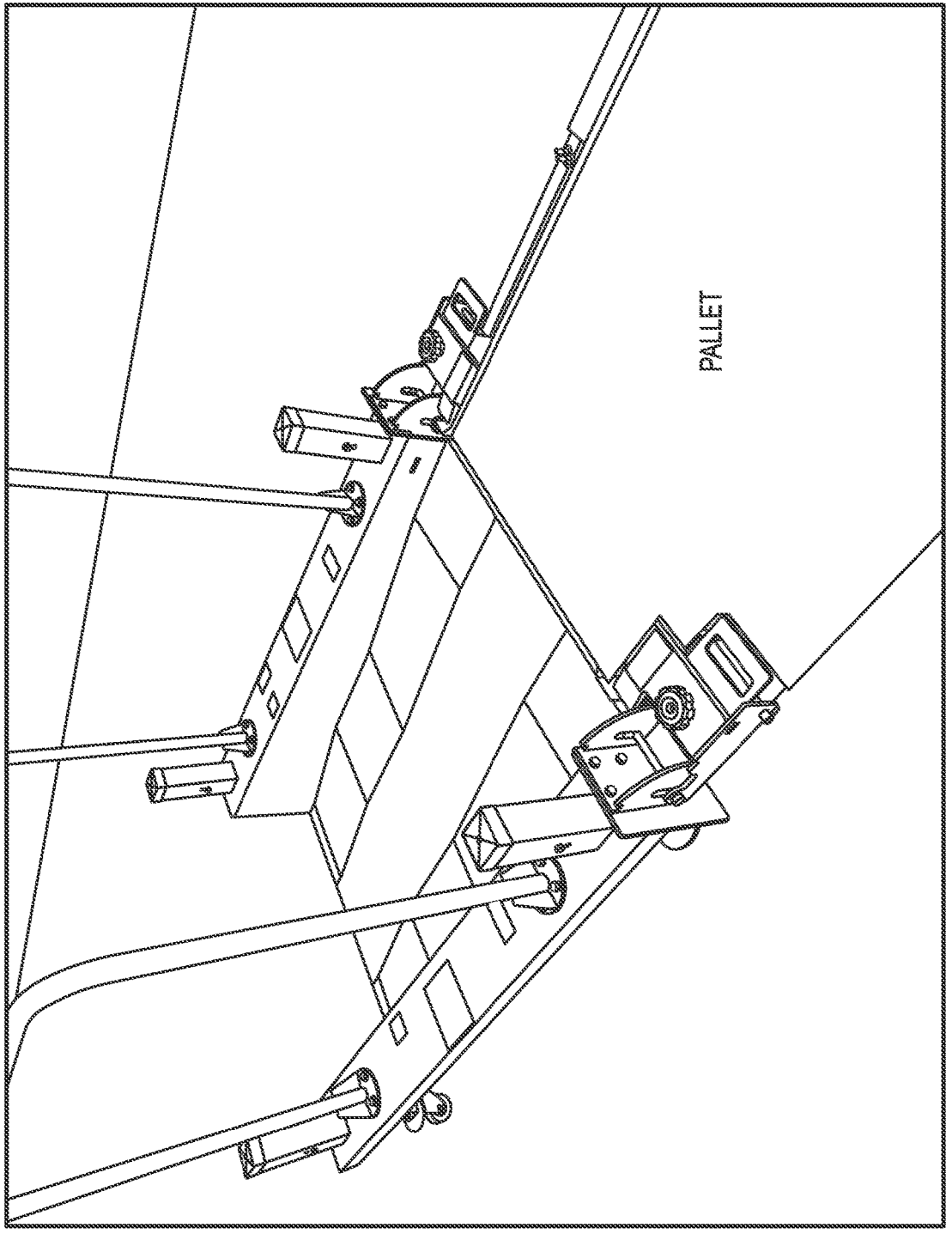
FIG. 8 shows a perspective view of an embodiment of a mobile ramp attached to a pallet.
Figure 9:
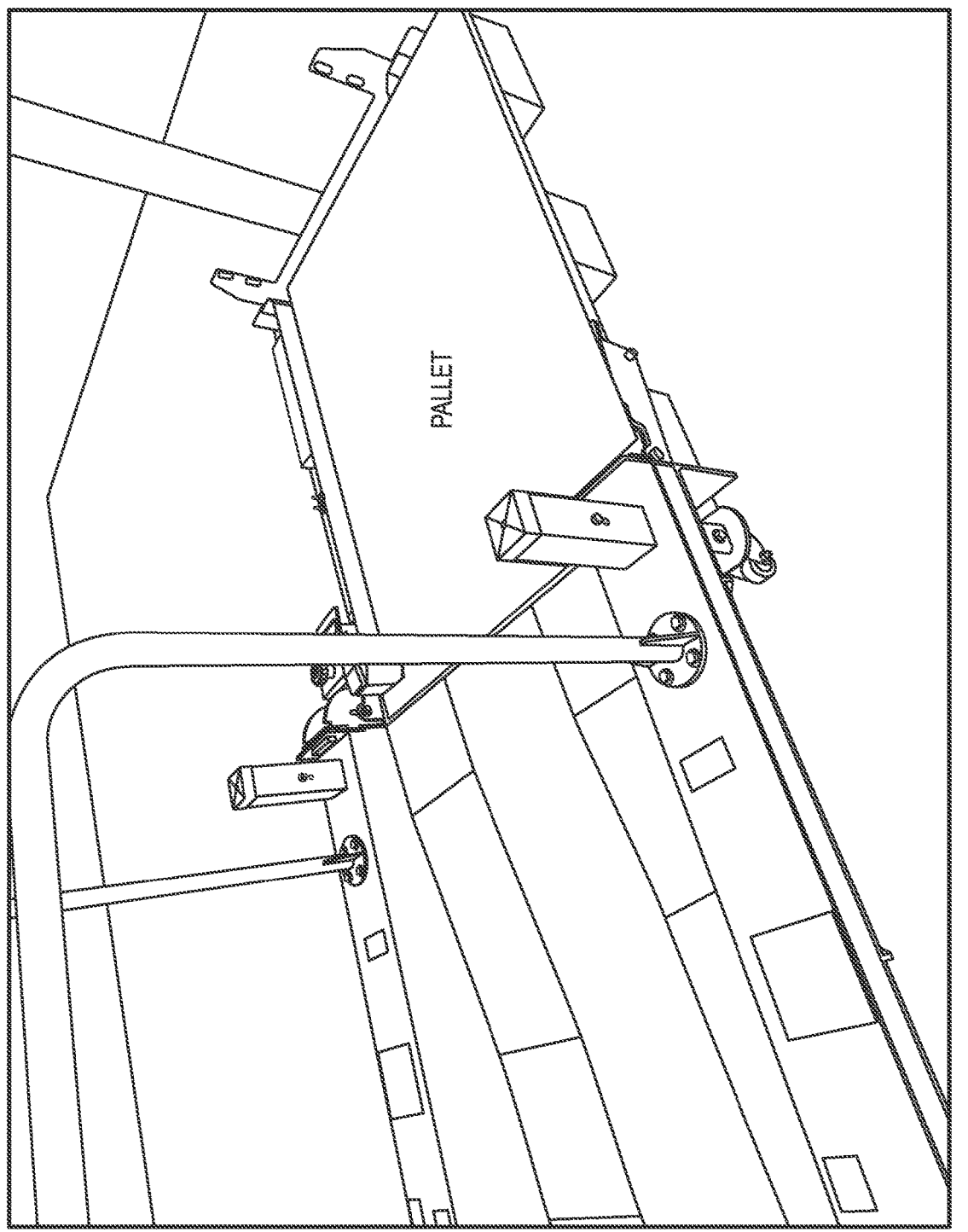
FIG. 9 shows a perspective view of an embodiment of a mobile ramp attached to a pallet.
Figure 10:
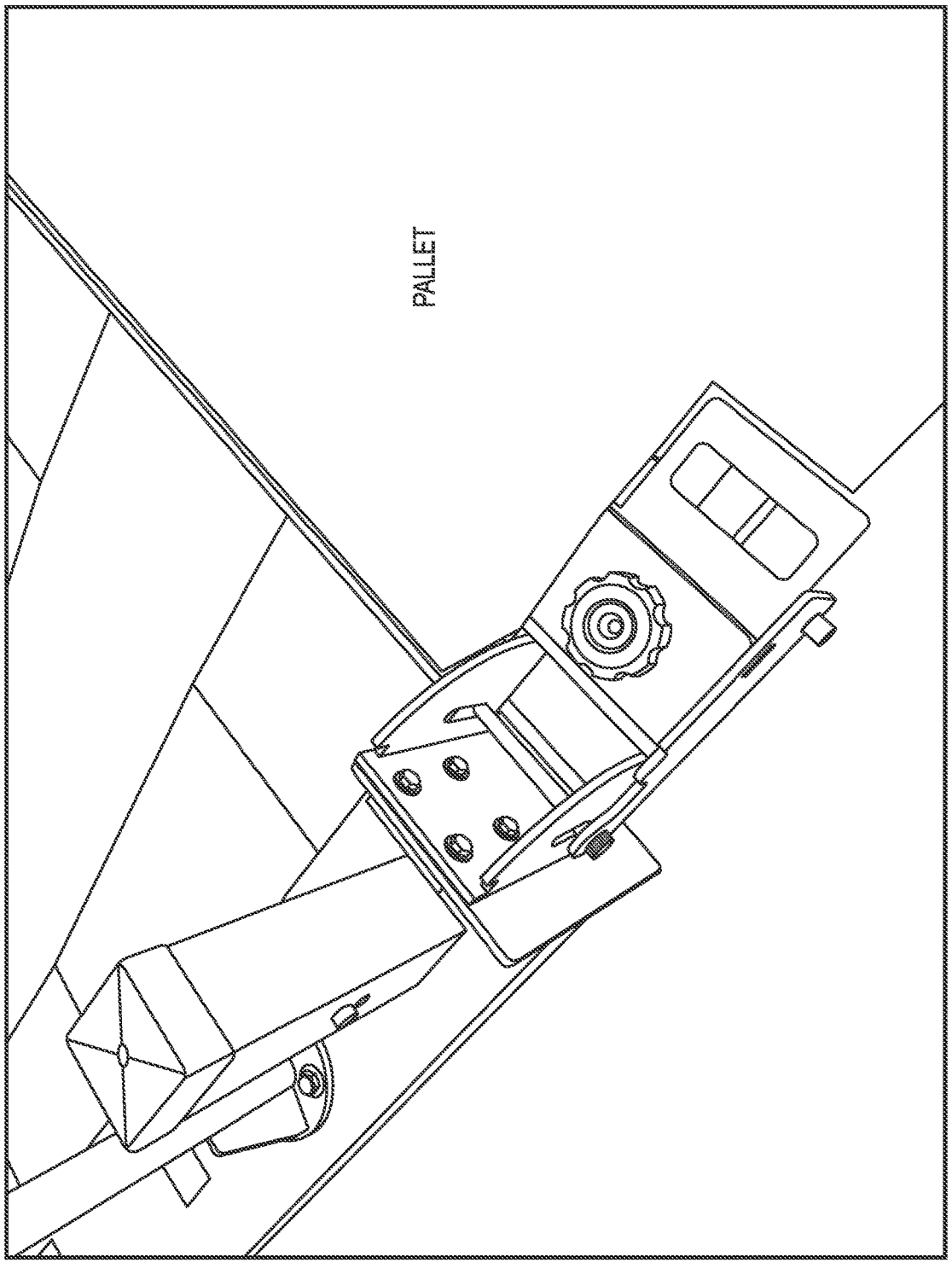
FIG. 10 shows a perspective view of an embodiment of a mobile ramp attached to a pallet.
Figure 11:
FIG. 11 shows a perspective view of an embodiment of a mobile ramp attached to a pallet with a tug entering the mobile ramp.
Figure 12:
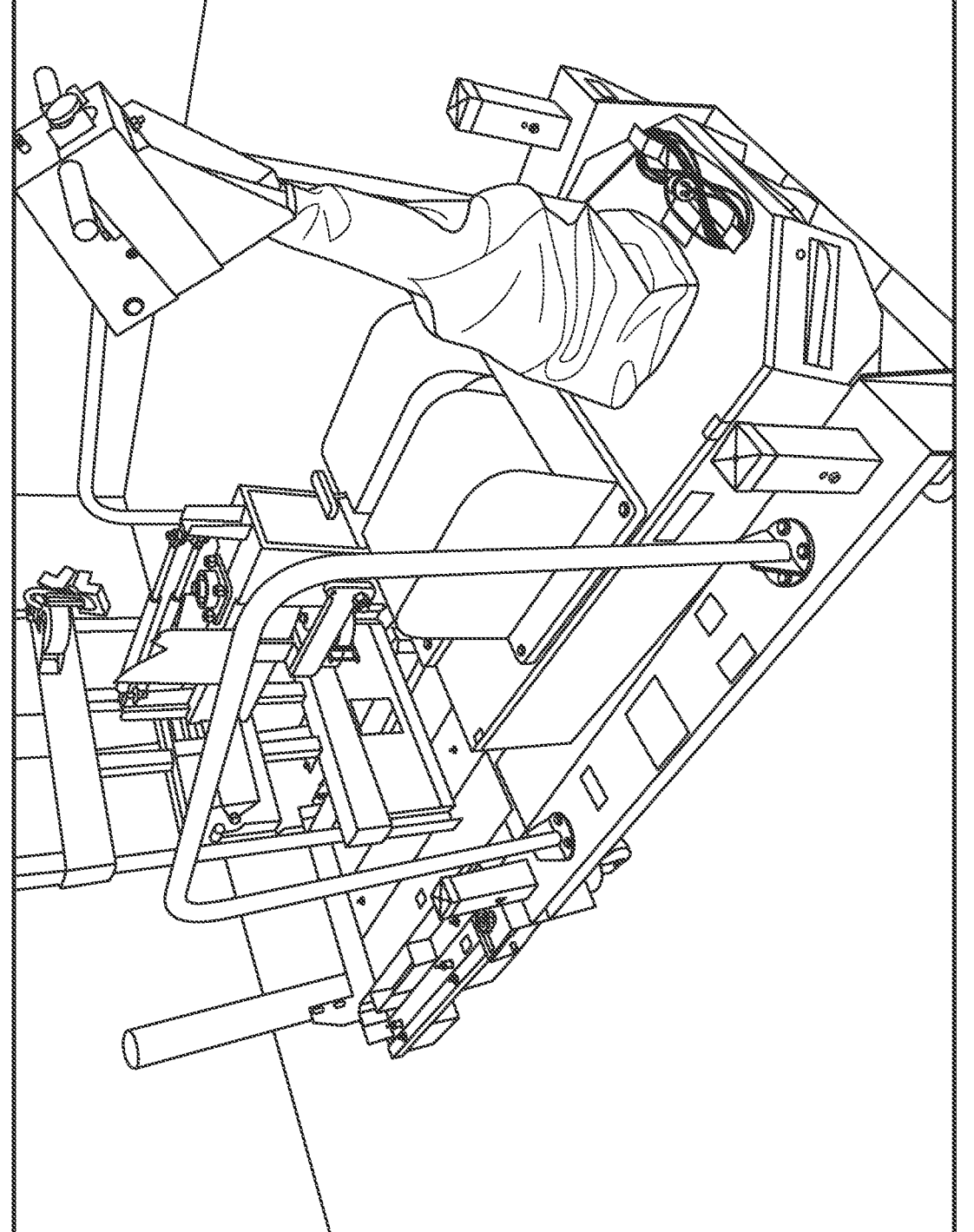
FIG. 12 shows a perspective view of an embodiment of a mobile ramp attached to a pallet with a tug on the mobile ramp.
Figure 13:
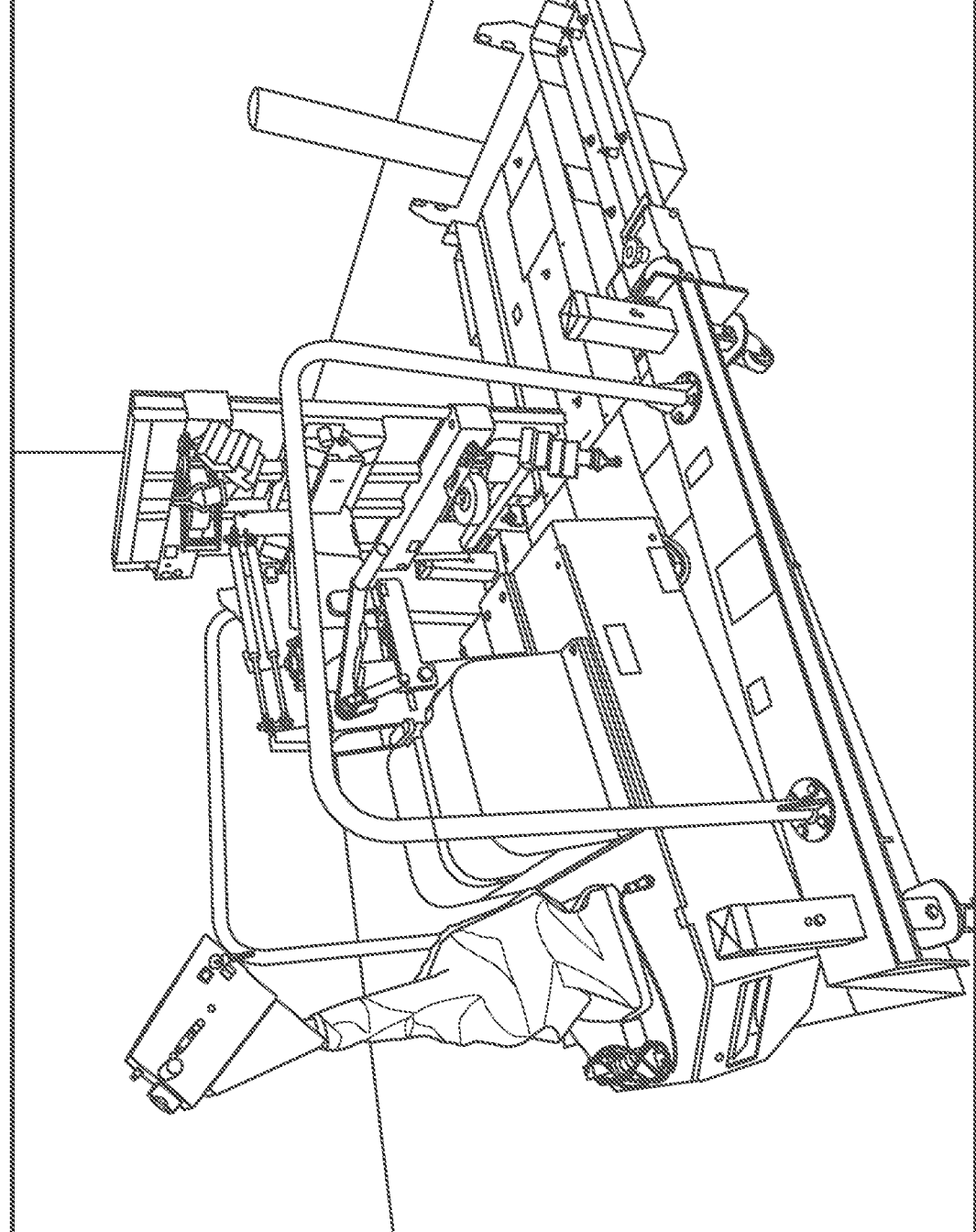
FIG. 13 shows a perspective view of an embodiment of a mobile ramp attached to a pallet with a tug on the mobile ramp.
Figure 14:
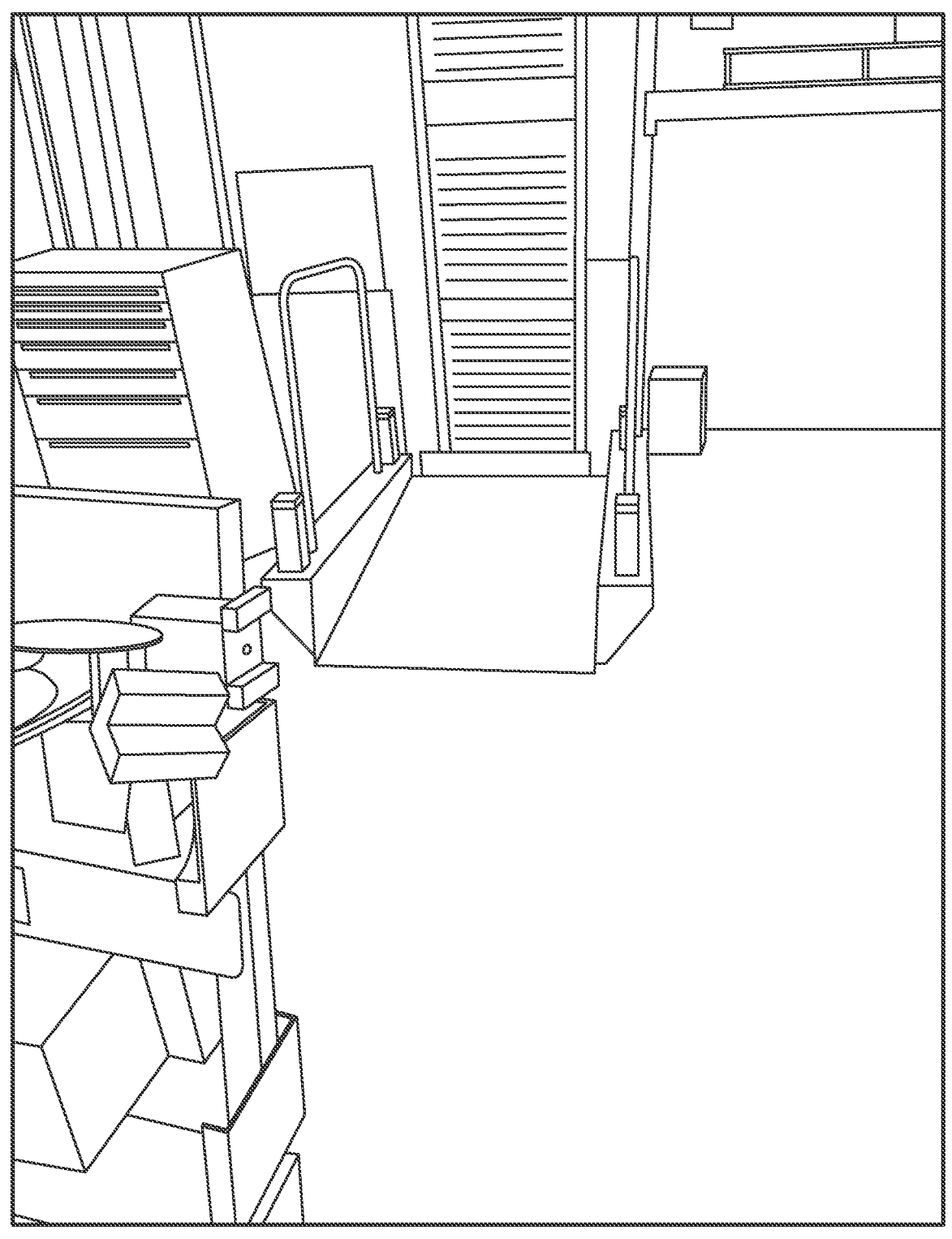
FIG. 14 shows a perspective view of an embodiment of a mobile ramp attached to a pallet with a loaded server rack.

FIG. 7 shows a perspective view of an embodiment of a mobile ramp attached to a pallet. FIG. 8 shows a perspective view of an embodiment of a mobile ramp attached to a pallet. FIG. 9 shows a perspective view of an embodiment of a mobile ramp attached to a pallet. FIG. 10 shows a perspective view of an embodiment of a mobile ramp attached to a pallet. FIG. 11 shows a perspective view of an embodiment of a mobile ramp attached to a pallet with a tug entering the mobile ramp. FIG. 12 shows a perspective view of an embodiment of a mobile ramp attached to a pallet with a tug on the mobile ramp. FIG. 13 shows a perspective view of an embodiment of a mobile ramp attached to a pallet with a tug on the mobile ramp. FIG. 14 shows a perspective view of an embodiment of a mobile ramp attached to a pallet with a loaded server rack.

The server may include springs, also referred to herein as struts, such as gas springs or gas struts that may automatically adjust the height of the ramp for use as a ramp or for moving the ramp. The springs such as gas springs are used to raise the ramp to an elevated position for transport, such as around a building or other facility. When the tug rolls up the ramp, such as to where it can engage with the server rack, the weight of the tug depresses the gas springs until the pallet attachments land on the top surface of the pallet and the entrance end of the ramp contacts the floor. When the tug and the towed cargo such as the server rack are pulled off the ramp, the gas springs raise the ramp such that the contact surfaces are clear of the pallet and floor, thus enabling the operator to push the ramp to the next pallet location. Examples of gas springs that may be used in various embodiments are provided by Suspa Inc. of Grand Rapids, MI, but alternative gas springs may also be used.

Figure 15:
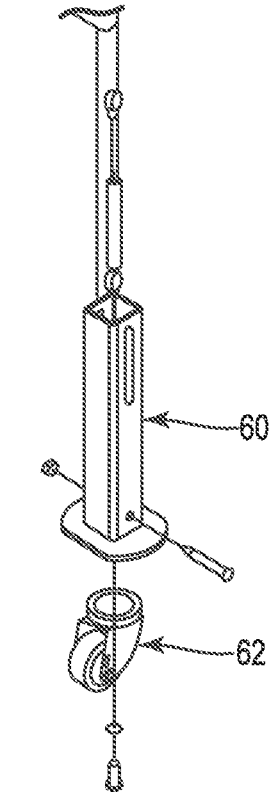
FIG. 15 shows an exploded view of an embodiment of a gas spring and wheel.

FIG. 15 shows an exploded view of an embodiment of a gas spring and wheel. The gas spring 60 is located in a vertical tube, directly above the wheel caster 62. A gas spring such as gas spring 60 may be located at each wheel of the ramp.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned.

Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

The invention claimed is:

1. A moveable ramp, comprising:
a ramp structure comprising a plurality of planar portions comprising:
a lower inclined portion;
an upper inclined portion;
a first horizontal portion extending between the lower inclined portion and the upper inclined portion; and
a second horizontal portion extending from an upper end of the upper inclined portion, wherein the first horizontal portion and the second horizontal portion are spaced apart by a distance equal to the distance between front and rear wheels of a tug configured to be used with the ramp; and
a locking mechanism at a top end of the ramp configured to secure the ramp to a pallet.

2. The moveable ramp of claim 1 wherein the locking mechanism comprises a latch configured to engage a pallet rail.

3. The moveable ramp of claim 1 further comprising a plurality of springs.

4. The moveable ramp of claim 3 wherein the springs comprise gas springs.

5. The moveable ramp of claim 1, further comprising at plurality of wheels attached to a bottom of the ramp.

6. The moveable ramp of claim 5 further comprising a plurality of gas springs located between each wheel and the bottom of the ramp.

7. The moveable ramp of claim 1 further comprising a ground portion, the ramp portion further comprising a ground portion extending from a lower end of the lower inclined portion and configured to touch the floor.

8. The moveable ramp of claim 7 wherein the ground portion is generally horizontally oriented.

9. A method of loading or unloading a cargo onto or from a stepped up delivery location, the method comprising:
positioning a ramp adjacent to the pallet, the ramp comprising:
a ramp structure comprising a plurality of planar portions comprising
a lower inclined portion;
an upper inclined portion;
a first horizontal portion extending between the lower inclined portion and the upper inclined portion; and
a second horizontal portion extending from an upper end of the upper inclined portion; and a locking mechanism at a top end of the ramp config- ured to secure the ramp to an elevated delivery location;

locking the ramp to the pallet using the locking mecha- nism;

moving a wheeled delivery tug having a first wheel and a second wheel up the ramp until the first wheel is located on the first horizontal portion of the ramp and the second wheel is located on the second horizontal por- tion of the ramp; and automatically leveling the ramp with gas struts attached to the ramp after positioning the ramp, wherein automati- cally leveling the ramp comprises a user walking on the ramp or a tug moving onto the ramp.

10. The method of claim 9 wherein the first wheel comprises a rear wheel of a tug and the second wheel comprises a front wheel of a tug, wherein moving the wheeled delivery tug comprises backing the wheeled deliv- ery tug up the ramp.

11. A method of loading or unloading a cargo onto or from a stepped up delivery location, the method comprising:

positioning a ramp adjacent to the pallet, the ramp com- prising:
a ramp structure comprising a plurality of planar por- tions comprising
a lower inclined portion;
an upper inclined portion;
a first horizontal portion extending between the lower inclined portion and the upper inclined portion; and
a second horizontal portion extending from an upper end of the upper inclined portion; and
a locking mechanism at a top end of the ramp configured to secure the ramp to an elevated delivery location;
locking the ramp to the pallet using the locking mecha- nism;
moving a wheeled delivery tug having a first wheel and a second wheel up the ramp until the first wheel is located on the first horizontal portion of the ramp and the second wheel is located on the second horizontal por- tion of the ramp, wherein loading or unloading a cargo onto or from the elevated delivery location comprises unloading a cargo from a pallet, further comprising:
connecting the cargo to the tug and then moving the tug off of the ramp with the attached cargo.

12. A method of loading or unloading a cargo onto or from a stepped up delivery location, the method comprising:

positioning a ramp adjacent to the pallet, the ramp com- prising:
a ramp structure comprising a plurality of planar por- tions comprising
a lower inclined portion;
an upper inclined portion;
a first horizontal portion extending between the lower inclined portion and the upper inclined portion; and a second horizontal portion extending from an upper end of the upper inclined portion; and
a locking mechanism at a top end of the ramp config- ured to secure the ramp to an elevated delivery location;
locking the ramp to the pallet using the locking mecha- nism;
moving a wheeled delivery tug having a first wheel and a second wheel up the ramp until the first wheel is located on the first horizontal portion of the ramp and the second wheel is located on the second horizontal por- tion of the ramp, wherein loading or unloading a cargo onto or from the elevated delivery location comprises loading a cargo onto a pallet, wherein moving the wheeled delivery tug onto the ramp comprises moving the wheeled delivery tug with an attached cargo onto the ramp until the cargo is in position on the pallet, further comprising:
detaching the cargo from the wheeled delivery tug onto the pallet.

13. The method of claim 9 wherein the cargo comprises a wheeled server rack.

14. A moveable ramp, comprising:

a ramp structure comprising a plurality of planar portions comprising:
a lower inclined portion;
an upper inclined portion;
a first horizontal portion extending between the lower inclined portion and the upper inclined portion;
a second horizontal portion extending from an upper end of the upper inclined portion wherein the first horizontal portion and the second horizontal portion are spaced apart by a distance equal to the distance between front and rear wheels of a tug configured to be used with the ramp; and
a ground portion extending from a lower end of the lower inclined portion, the ground portion config- ured to abut a floor when the ramp is in position for use;
a locking mechanism at a top end of the ramp configured to secure the ramp to a pallet;
a plurality of springs; and
a plurality of wheels.

15. The movable ramp structure of claim 14 wherein the plurality of springs comprises gas springs.

16. The movable ramp structure of claim 15 wherein the gas springs are configured to lower the ramp such that the ground portion abuts the floor when the ramp is in position for use and to raise the ramp such that the ground portion does not abut the floor when the ramp is moved.

17. The movable ramp structure of claim 14 wherein the ground portion is horizontal.

* * * * *